C. F. YOUNG.
AUTOMOBILE TRANSMISSION LEVER EXTENSION.
APPLICATION FILED OCT. 2, 1917.
1,262,425.
Patented Apr. 9, 1918.
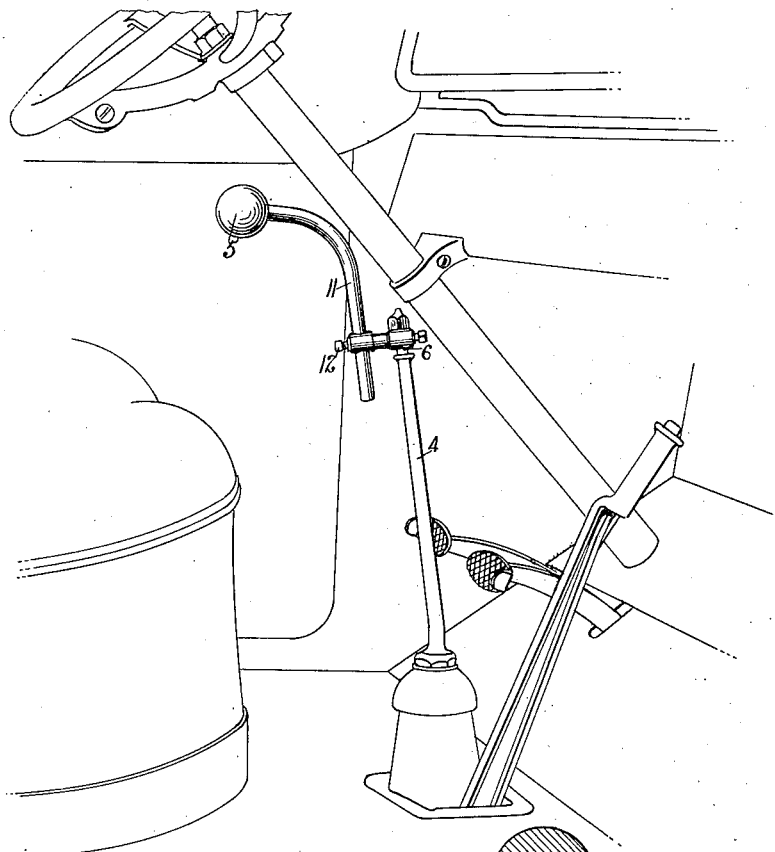
Fig. 1.
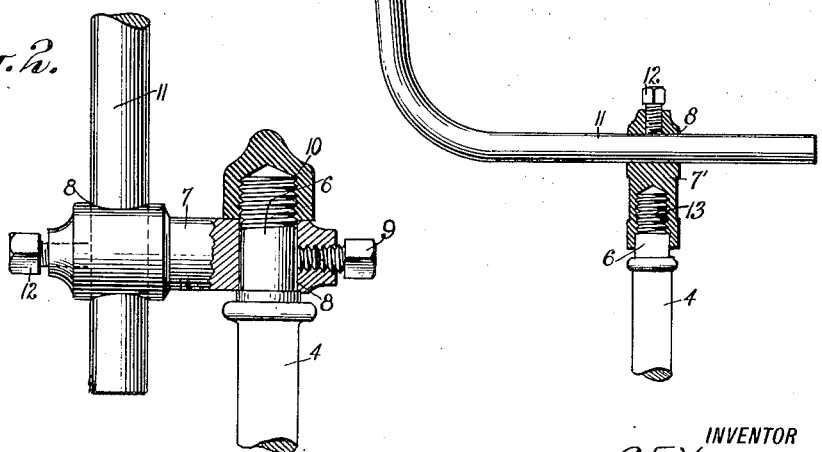
Fig. 2.
Fig. 3.
WITNESSES
INVENTOR
C. F. Young
BY
ATTORNEYS

UNITED STATES PATENT OFFICE.

CHARLES F. YOUNG, OF PHILADELPHIA, PENNSYLVANIA.

AUTOMOBILE-TRANSMISSION-LEVER EXTENSION.

1,262,425.     Specification of Letters Patent.     Patented Apr. 9, 1918.

Application filed October 2, 1917. Serial No. 194,343.

*To all whom it may concern:*

Be it known that I, CHARLES F. YOUNG, a citizen of the United States, and a resident of Philadelphia, in the county of Philadelphia and State of Pennsylvania, have invented a new and Improved Automobile-Transmission-Lever Extension, of which the following is a full, clear, and exact description.

The object of the invention is to provide a lever extension which can be easily and quickly secured to the lever and thereby permit operation of same without moving the body while driving a car.

The invention is characterized by an L-shaped rod which has means for engaging the lever so as to be presented in proximity of the seat from where the car is operated.

Other characteristics of the invention will appear as the description proceeds.

In the accompanying drawings, forming part of the application, similar characters of reference indicate corresponding parts in all the views.

Figure 1 is a fragmentary perspective view of an automobile showing the controlling lever provided with an extension embodying my invention;

Fig. 2 is an enlarged elevation of the control lever and the means for attaching the extension, a portion of the structure being broken away to show the details of construction; and Fig. 3 is a similar view showing a modified form of securing the extension to the lever.

Referring to the drawings, 4 is the transmission-control lever of the car. The ball 5 of same, normally found at the end, is removed, thereby exposing the shank 6 the extremity of which is threaded. A yoke 7 having two parallel bores 8 is secured to the shank through the engagement of one of its bores with the shank, a set screw 9 being provided to prevent accidental displacement of the yoke on the shank, and, in addition, a cap 10 is threaded on to the extremity of the shank so as to prevent injury to the threads.

An L-shaped rod 11 has one of its ends threaded. The other end is adapted to fit into the second bore 8 of the yoke 7 and may be clamped in any desired position by means of a set screw 12.

The ball 5 fits on to the threaded end of the L-shaped rod 11. The set screw 12 permits the adjustment of the L rod 11 so as to present the ball 5 at any desired point for engagement without necessitating a bodily displacement by the operator when desiring a shift of gears in changing speed.

In Fig. 3 the yoke 7 is shown with an axial threaded bore 13 for engaging the threaded end of the shank 6. The yoke 7' has a bore 8' disposed transversely of the yoke to receive the end of the L-shaped lever 11 which is locked therein by the set screw 12.

From the above description it will be seen that the extension can be quickly secured, and it will not require a skilled worker for attaching and detaching the same.

I claim:

In combination with an automobile speed control lever having a threaded shank, a yoke having parallel bores, one for engaging the shank, an L-shaped rod adapted to engage the other bore, set screws in the bores for clamping the yoke to the shank and the rod to the yoke, a cup adapted to engage the threaded portion of the shank, and a ball at the end of the L-shaped rod for forming a grip to handle the same.

CHARLES F. YOUNG.